July 27, 1954
C. H. O. BERG
2,684,928
SOLIDS CONVEYANCE OF CONTACT MATERIAL
IN COMPACT FORM AND APPARATUS
Filed April 18, 1949
2 Sheets-Sheet 2
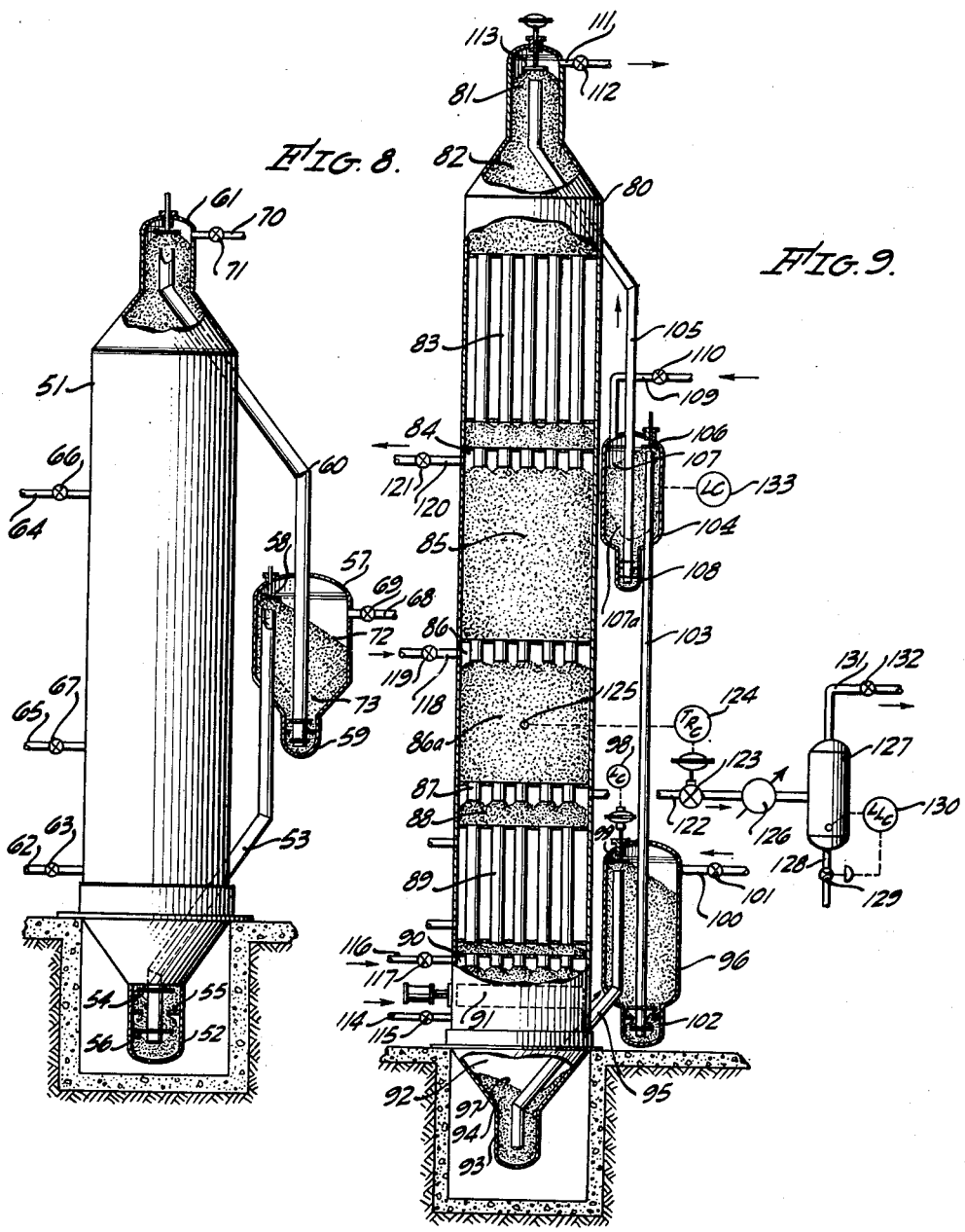
INVENTOR.
CLYDE H. O. BERG,
BY Ross J. Garofalo
ATTORNEY.

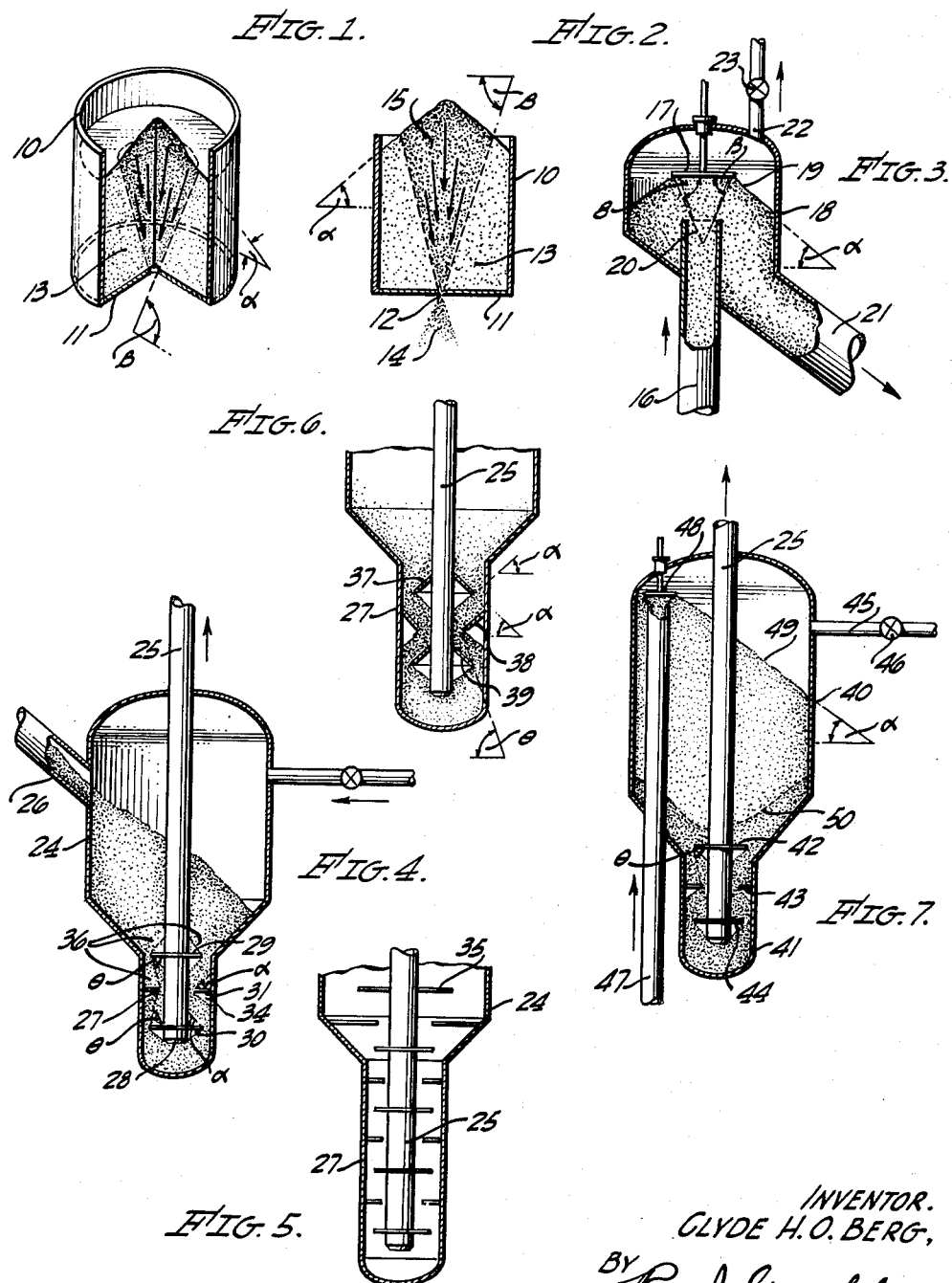

Patented July 27, 1954

2,684,928

UNITED STATES PATENT OFFICE 2,684,928

SOLIDS CONVEYANCE OF CONTACT MATERIAL IN COMPACT FORM AND APPARATUS

Clyde H. O. Berg, Long Beach, Calif., assignor to Union Oil Company of California, Los Angeles, Calif., a corporation of California Application April 18, 1949, Serial No. 88,084

24 Claims. (Cl. 196—52)

1

This invention relates broadly to the conveyance of granular solids and more specifically relates to a method and apparatus for the conveyance of a substantially compact moving bed of granular solids under the impetus of a gas stream through a conduit. This invention more specifically relates to an improved process and apparatus for the separation of gaseous mixtures on solid granular adsorbents in which the improved solids conveyance is incorporated.

It is a primary object of the present invention to provide an improved solids conveyance method for the transportation of granular solid materials in the presence of a gas through a conduit.

It is a further object of this invention to provide an improved apparatus through which granular solids will pass freely under the driving force of a pressure differential in one direction but which will prevent the flow of solids in the reverse direction wherein pressure differential is reversed.

It is an additional object of the present invention to provide an improvement in the method of solids recirculation in processes in which the circulation of granular solids, adsorbents, catalysts and the like are integral parts of the process.

An additional object and an advantage of the present invention is to provide an improved solids conveyance means which has inherently a high operating efficiency and a low attrition rate whereby the granular solids are transported substantially without loss due to abrasive deterioration or attrition.

A more specific object of this invention is to provide an improved selective adsorption process for the separation of gaseous mixtures in which the solid granular adsorbent is circulated through an adsorption column according to the principles of this invention.

Another object of this invention is to provide apparatus adaptable to carrying out the aforementioned objects.

Other objects and advantages of this invention will become apparent to those skilled in the art as the description thereof proceeds.

Briefly the present invention comprises a method by means of which solid granular materials may be transported under the influence of a lifting gas with reduced abrasion and attrition losses to the solids and in a simpler manner. It has now been found that certain flow characteristics of moving beds of granular solids permit them to be handled in specialized apparatus for conveyance from one place to another wherein these

2 characteristics are utilized to provide a method in which the solids flow in one direction but are inhibited from flowing in the reverse direction. This apparatus in which this method is carried out comprises a sort of solids flow check valve which, when connected with proper conduits operating at proper pressure differentials, permits the conveyance of granular solids in a single direction through the system.

The present invention also comprises a combination of the aforementioned solids flow method and solids check valve apparatus with suitable lift lines or conduits in apparatus through which solid granular solids are to be circulated. Specifically the present invention comprises a combination of a continuous selective adsorption column in which gaseous mixtures are separated in the presence of a recirculating moving bed of adsorbent in combination with the conveyance apparatus described more fully hereinafter.

It has now been found that the base angle of a conical accumulation of granular solids on a substantially horizontal flat surface is one which is substantially different from the base angle of an inverted conical accumulation of granular solid which flows from a body of granular solids through a small orifice in the aforementioned horizontal surface. Restated, the angle of repose (which is the base angle of a conical accumulation of solids on a horizontal surface) is different from the base angle of a cone-shaped moving mass of granular solids flowing from a larger accumulation of solids through a small orifice in a horizontal surface. These findings in different terms include the fact that the base angle of a conical accumulation of granular solids resting on a horizontal plane and having an upper solids-gas surface exposed is substantially different from the base angle of an inverted conical moving mass of solids having a stationary solids-moving solids surface formed when solids are withdrawn from a small orifice in a horizontal plane upon which the stationary solids rest. For example, activated vegetable charcoal having a mesh size range of from about 12 to 20 mesh has an angle of repose of about 45°; whereas, the base angle of that moving portion of charcoal removed through an orifice in a horizontal surface overlain by an accumulation of charcoal has an inverted conical shape the base angle of which is about 70°. For other granular solids the specific angles referred to are different from those cited above, but it has been found for such other solids that the angle of repose or the static angle is different from the dynamic angle of an inverted cone of moving solids measured when the solids are in motion. These angles are determined almost solely by the physical characteristics of the granular solids and vary with density of material, mesh range of granules, the per cent of fines in the granular solids, and other physical properties.

These specific physical properties have been applied to an improved method for solids conveyance which incorporates a method of permitting flow of granular solids in one direction, while, without moving mechanical devices, the solids flow is prevented in the reverse direction even under the driving forces of a reverse gas flow of high pressure drop. From these discovered physical characteristics of granular solids in motion, a conveyance method has been found whereby an accumulation of granular solids existing at one pressure may be conveyed in substantially compact form to a second point by causing gas flow from the accumulation to the second point until the desired quantity has been transferred through an open unrestricted conduit and subsequently the solids delivered to the second point may be conveyed further to a third point merely by raising the pressure at the second point to a value considerably above that of the original source thereby causing the solids at the second point to be delivered to a third point in such a manner that solids flow from the second point to the original source is prevented.

The conveyance method just briefly described above has been incorporated in processes involving the conveyance of granular solids continuously in a recirculatory fashion through vessels such as reactors, adsorbers, and the like with unusually favorable results. Specifically the conveyance method has been incorporated in the continuous selective adsorption process in which a moving bed of substantially compact granular adsorbent is continuously recirculated through an adsorption column in countercurrent contact with a gaseous mixture and fractions thereof to be separated. The conveyance method in this process permits the removal of adsorbent from the bottom of the column and its unidirectional conveyance in a series of pressuring and depressuring stages from the bottom of the column to the top thereof or another column through a specially designed conduit lift line.

The nature of the process and apparatus of the present invention is more easily described in conjunction with the included drawings in which:

Figures 1 and 2 illustrate the difference between the static angle of repose where a solids-fluid surface exists and the dynamic angle of flow where a moving solids-stationary solids surface exists in bodies of granular materials, Figure 3 illustrates the existence of the static angle and the dynamic angle in the conveyance of granular solids and use in the conveyance of solids described in a copending application, Serial No. 67,237, Figures 4, 5, 6, and 7 show vertical cross sections of the solids flow check valve apparatus of the present invention through which granular solids may be passed in one direction but not in the reverse direction without valves in the lines through which solids pass, Figure 8 shows an elevation view of a vessel through which a granular solid is continuously recirculated with the conveyance method and apparatus of this invention, and Figure 9 shows a combination flow diagram and vertical cross section of a continuous selective adsorption column in which the adsorbent is circulated with a conveyance method of this invention.

Referring now more particularly to Figure 1, an isometric cut-away view is shown of a cylindrical container 10 having horizontal bottom 11 provided with orifice 12 in the center thereof. A body of granular solids 13 is contained in container 10. The top solids-gas surface of the accumulation has a conical shape, a base angle of which is angle alpha. This is the static angle or the angle of repose. When a small amount of granular solids is withdrawn from accumulation 13 through aperture or orifice 12 this amount is withdrawn from a central moving portion of the mass of solids, which moving portion has an inverted conical shape shown in the drawing and an outer moving solids-stationary solids surface. The base angle of this conical body is the dynamic angle beta.

In Figure 2 a vertical cross section of container 10 of Figure 1 is shown showing mass of solids 13 and a small quantity of solids 14 being withdrawn from orifice 12. The conical surface of the upper part of the bed of solids is evident and the base angle of this cone is the static angle alpha. When a small quantity 14 of solids is withdrawn from orifice 12 the only part of the body of adsorbent which flows toward the orifice is that part included in inverted cone 15 having its apex at orifice 12. The base angle of this conical mass 15 is the dynamic angle beta. The fact that there is a difference between angles alpha and beta is utilized in apparatus of the present invention to form a solids flow check valve as hereinafter more fully described.

The dynamic angle beta is not only exhibited in masses of granular solids subject to gravity flow as described in connection with Figure 2, but also in solids flow under the influence of moving gases. For example, in copending application, Serial No. 67,237, a conveyance method and apparatus is described in which substantially compact moving beds of granular solids are caused to flow upwardly through a conduit under the influence of a depressuring lift gas. The term "substantially compact" as applied to moving beds of solids conveyed according to this invention is used in the same sense as it is in the copending application Serial No. 67,237 referred to above. Solids in substantially compact form are there defined as a mass of solids having a bulk density which is substantially equal to the static bulk density of the solids when at rest, as distinguished from fluidized or suspended solids systems. The receiver or separating zone for such an apparatus in which the lift gas and the solids are separated is reproduced in Figure 3 wherein the solids flow upwardly through lift line or conduit 16 against thrust plate 17 and accumulate in separator 18. As explained in the copending application Serial No. 67,237 referred to, the presence of the thrust plate maintains the solids at substantially the static bulk density and prevents fluidization by applying a compacting or compressive force against the moving bed of solids discharging from the outlet extremity of the conveyance conduit. The static angle alpha is at once apparent in the upper truncated conical surface 19 of the adsorbent in separator 18 wherein a solids-lift gas interface is present. The dynamic angle beta comprising the base angle of inverted conical mass of adsorbent 20 is shown where thrust plate 17 is lowered to a position sufficient to completely cover the base of cone 20 which results in a controlled upward flow of a substantially compact mass of solids through line 16. When thrust plate 17 is raised so that the area of plate 17 is insufficient to cover the base of cone 20 at that height, the lifting operation radically changes and the solids are conveyed as a gaseous suspension at high uncontrollable velocities resulting in excessive attrition rates and at lift gas to adsorbent ratios which are uneconomical. Cone 20 is a mass of adsorbent through which the lifting forces of the lift gas on the adsorbent existing at the upper extremity of lift line 16 are dissipated against plate 17.

Angle theta is the base angle of a cone determined by the base area of thrust plate 17 and the open area of lift line 16 under which stable controllable operation results. Under these desired conditions angle theta is less than angle beta, greater than alpha, and operable modifications of this process and apparatus have been found to exist within these limits. The apparatus in Figure 3 under these conditions of operation permits a smooth delivery of granular solids from separator 18 via transfer line 21 and the lift gas is continuously withdrawn via line 22 controlled by valve 23.

Referring now more particularly to Figure 4, vessel 24 from which granular solids are to be conveyed through lift line 25 to another point is shown. Into vessel 24 is introduced a stream of granular solids via line 26. Induction zone 27 is integrally attached to the bottom of vessel 24 and lift line 25 extends downwardly and coaxially through vessel 24 into induction section 27. Induction section 27 is cylindrical in shape and has a concentric relationship with the lower extremity of lift line 25. The lower end of lift line 25 is provided with restriction 28 described in copending application Serial No. 67,237 and is further provided with inner radial baffles 29 and 30. The diameter of these baffles is not sufficient to reach the inner wall of induction zone 27 and thus completely fill the annular volume existing between the lower end of lift line 25 and induction section 27. Induction section 27 is also provided with outer radial baffle 31 positioned between baffles 29 and 30 and which extends from the inner wall of induction zone 27 toward the lower end of lift line 25 past the edges of baffles 29 and 30 so that a tortuous path for the adsorbent flow is formed around the open edges of the baffles, i. e. those edges not directly attached to a surface. The function of this apparatus is to cause the upward flow of granular solids through line 25 under the influence of lift gas introduced into vessel 24 under pressure via line 32 controlled by valve 33 and to prevent the reverse flow of solids down through line 25 into vessel 24 when the pressure of lift gas in vessel 24 is lower than the pressure existing at the upper extremity of line 25.

The relationship of the position of these annular baffles with respect to each other must be maintained within certain limits in order to permit this desired operation. The angle with which a line drawn on a vertical plane through induction zone 27 and extending from one open edge of one baffle to the corresponding open edge of the baffle immediately adjacent is the angle theta. As described above this angle theta must be less than dynamic angle beta for smooth operation.

Under conditions where the pressure in vessel 24 is less than the pressure in line 25, gas flow down through line 25 into induction zone 27 results. This reverse gas flow passes through the open annular space between baffle 30 and the inner wall of induction zone 27 exerting an upward lifting force upon the adsorbent present in that annular space. These lifting forces tend to cause an upward flow of solids in the bed and create a moving solids-stationary solids interface of conical shape with a base angle beta. This flow of solids tend to fill open volume 34 and the lifting forces are dissipated in thrusting against the lower surface of annular baffle 31. Angle theta is shown as being less than angle beta and no appreciable upward flow of solids is possible. The lift gas then passes on through the annular space between baffle 31 and the outer surface of the lower part of lift line 25 and the lifting forces on the adsorbent present in this space are again dissipated through dynamic angle beta against the lower surface of annular baffle 29. Baffles 30 and 31 are theoretically all that are required in preventing a reverse solids flow. However, baffle 29 is shown to further aid in such prevention. The upward flow of adsorbent from induction zone 27 into vessel 24 is hereby prevented.

The upward flow of solids from induction zone 27 through lift line 25 is permitted because the flow of granular solids through the open annular spaces existing between the open edges of the baffles and the opposing surfaces of either line 25 or cylindrical induction section 27 causes the static solids-gas surface of the solids below the baffle next above to lower thereby permitting solids flow around the open edge of that baffle to maintain the static angle alpha at that lift gas-solids interface.

A further modification of the solids flow check valve described in Figure 4 is shown in Figure 5 in which a multiplicity of alternate annular baffles are employed in induction section 27, together with annular baffles of increased size in the lower portion of vessel 24. This construction provides two principal advantages: first, under conditions of reverse gas flow, that is downwardly through lift line 25, the reverse flow of any solids is positively prohibited; and second, the annular space open to gas flow in vessel 24 through a solids-gas interface or through the annular space between baffle 35 and the wall of vessel 24 is sufficiently great to reduce the velocity of lift gas passing therethrough and thus prevent the suspension and conveyance of any of the granular solids in this fashion.

In Figures 4 and 5, the annular baffles employed in induction zone 27 have been substantially perpendicular to the axis of the lift line and stagnant accumulations of solids 36 exist on the upper surfaces of the annular baffles. In Figure 6 a modification of the solids check valve is shown in which lift line 25 and induction section 27 are provided with truncated conical baffles 37, 38 and 39. The base angle of these conical baffles is preferably about equal to or greater than the static angle alpha. Therefore, adsorbent contacting the upper surfaces of the baffles flows around them without forming any stagnant accumulations. Again a line drawn between the corresponding open edges of adjacent baffles makes an angle theta with the horizontal whereby upward flow of adsorbent due to the thrusting forces resulting from reverse lift gas flow are dissipated against the lower surfaces of the annular conical baffles.

In Figure 7 a vertical cross section of a vessel provided with the solids flow check valve is shown and by means of which solids may be conveyed from a lower point into this vessel when the pressure of the vessel is low and out of this vessel to a higher point when the pressure of this vessel is raised above a mean pressure. This apparatus is called an intermediate pressuring vessel and comprises pressuring vessel 40 which is usually of cylindrical form and which is provided at its lower extremity with induction section 41, also of cylindrical section. Lift line 25 extends as before concentrically through vessel 40 and induction section 41 and annular baffles 42, 43 and 44 are provided in section 41. Gas may be introduced into or withdrawn from pressuring vessel 40 via line 45 controlled by valve 46 to alter the gas pressure therein during operation. Solids may be introduced via lift line 47 in which latter they are maintained in substantially compact form by the action of thrust plate 48, the function of which has been described previously.

In practice, the apparatus of Figure 7 is operated at a lower pressure than that existing at the other extremity of lift line 47 until the adsorbent flow therethrough is sufficient to raise the adsorbent level to that indicated by level 49 which has a static angle alpha. The other extremity of line 47 may be an apparatus similar to that shown in Figure 4 and which is provided with a solids check valve. When the pressure within vessel 40 is lower than the pressure existing at the other extremity of line 47, solids are caused to flow under the pressure differential upwardly through line 47 into vessel 40, but solids within lift line 25 are prevented from flowing downwardly into vessel 40 from a higher point, to which the solids are ultimately to be delivered, by the action of solids check valve present in induction zone 41. For this discussion, the pressure existing at the bottom of line 47 may be considered to be the same as that existing at the upper extremity of line 25. When solids level 49 in vessel 40 is raised to the point shown, lift gas may be introduced via line 45, raising the pressure therein to a value higher than that existing at the other extremities of lines 25 and 47 and a flow of lift gas upwardly through line 25 and downwardly through line 47 results. The upwardly flowing lift gas causes adsorbent to pass from vessel 47 through induction zone 41 and upwardly through lift line 25 while the solids check valve at the bottom of line 47 prevents downward flow of adsorbent therethrough. When the lift gas pressure within vessel 40 is high, upward flow of solids through line 25 causes level 49 to drop to such a level as that shown by level 50. At this time, the lift gas pressure in vessel 40 is lowered to effect an upward flow of solids through line 47 thereby again restoring the solids level to level 49.

The operation of this modification of apparatus is very similar to that of a reciprocating piston pump which receives material at low pressure through one line and discharges it at high pressure through another line. Again in this apparatus a line drawn between the open edges of the adjacent baffles makes an angle theta with the horizontal and it is less than angle beta, the dynamic force angle.

By combining such pieces of apparatus as shown in Figures 3, 4 and 7, a combination is formed which operates to cause the continuous conveyance of adsorbent in a single direction by means of a pulsating pressure whose limits are above and below a mean pressure of an operating system. Such a system is shown in Figure 8 in which a treating column 51 is shown through which a continuous downward flow of a solid granular material is to be maintained. Vessel 51, for example, may be a cracking reactor for the catalytic decomposition of hydrocarbons and the granular material may be a cracking catalyst. The conveyance operation, however, obviously applies regardless of the process being carried on.

Vessel 51 is provided at its lower extremity with induction zone 52 which is maintained at a pressure $P_1$ and into which lift line 53 extends. Annular baffles 54, 55 and 56 are provided to form the solids check valve described above. Intermediate pressuring vessel 57 is provided at a point between the upper and lower ends of column 51 and into which solids are discharged via first lift line 53 against thrust plate 58. Induction zone 59 and baffles contained therein provide a second solids check valve whereby upward flow through lift line 60 into separation zone 61 is allowed while preventing flow in the reverse direction. Lift gas may be introduced into the lower portion of column 51 via line 62 controlled by valve 63 or lift gas may be employed which is generated in or removed directly from the inner portions of vessel 51 and passes into induction zone 52 directly. For example, the lift gas may be a product gas, or a feed gas introduced into vessel 51, or removed therefrom via lines 64 and 65 controlled respectively by valves 66 and 67. The pulsating pressure employed to operate intermittent pressuring vessel 57 is supplied by introducing and removing gas via line 68 controlled by valve 69 from vessel 57. Lift gas passing upwardly through second lift line 60 into separator 61 operating at pressure $P_2$ is removed from the separator via lines 70 controlled by valve 71 and may be recompressed for introduction into vessel 57 at the high pressure limit of its pressure variation. Pressure $P_1$ may be the same as or substantially different from pressure $P_2$. The pressure drop maintained across first lift line 53 is $\Delta p_1$ and that across second lift line 60 is $\Delta p_2$ during solids flow. Intermediate pressuring vessel 57 is first depressured to a pressure of $P_1 - \Delta p_1$ to take solids from induction zone 52 and is then pressured to $P_2 + \Delta p_2$ for conveyance of these solids into separator zone 61. When $P_1$ and $P_2$ are substantially the same at a value $P$ the extremes of pressure in zone 57 are given by $P - \Delta p_1$ and $P + \Delta p_2$. Desirably, first and second lift line 53 and 60 are designed to permit equal flows of solids at substantially equal pressure drops of $\Delta p$ and for this condition the extremes of pressure are given by $P \pm \Delta p$.

As an example of operating conditions pertinent to such a system as that shown in Figure 8, the following data are given:

In a process, vessel 51 is operated at a pressure of 150 pounds per square inch and the pressure drop of lift gas through each of lift lines 53 and 60 is about 50 pounds per square inch. Solids are removed from induction zone 52 at the bottom of column 51 by lowering the pressure in intermediate pressure vessel 57 to a value of about 100 pounds per square inch by depressuring a lift gas upwardly through lift line 53. A simultaneous downflow of depressuring gas exists through line 60 but solids check valve 59 prevents downward flow of granular solids. When a sufficient amount of granular solids have been transferred from the bottom of the column via line 53 into intermediate pressure vessel 57 to raise the solids level therein to level 72, the pressure existing in vessel 57 is increased from 100 pounds per square inch (or from the pressure in vessel 51 minus the pressure drop across line 53) to a pressure of about 200 pounds per square inch (or to the pressure in vessel 51 plus the pressure drop across line 60) whereupon a flow of lift gas upwardly through line 60 carries granular solids from vessel 57 into separating section 61 for reintroduction at 150 pounds per square inch into column 51. The lift gas is removed therefrom via line 70. The solids level in pressuring vessel 57 drops to level 73 whereupon the pressure is lowered from the higher extreme to the lower so that solids may be again received from the bottom of the column.

A continuous transferral of solids may be thus obtained by employing one or two or more intermediate pressuring vessels operating in any desired sequence. Only one is shown in the drawing for the sake of clarity and simplicity in explanation. However, it is easily seen how an additional vessel may be operated in parallel. For example, one intermediate pressure vessel is discharging solids to separator 61 and thus emptying itself while the second intermediate pressure vessel is filling itself by receiving solids from induction zone 52. There are then two or more of each of lines 53 and 60.

This type of conveyance may be employed to advantage in the circulation of solids through treating vessel such as the granular, powdered or pelleted catalyst through reaction and regeneration zones in hydrocarbon cracking, coking, or in other catalytic operations. The solids are removed from the reactor and are all or in part conveyed to the regenerator from which they are removed and returned all or in part to the reactor. A lift gas such as flue gas may be employed for the conveyance of such catalysts.

Referring now to Figure 9 the process and apparatus of the present invention is shown in combination with a continuous selective adsorption column in which a circulating moving bed of solid granular adsorbent is employed to separate the individual constituents of gaseous mixtures from one another. Selective adsorption column 80 is provided at successively lower levels therein with separator 81, hopper zone 82, cooling zone 83, overhead gas product disengaging zone 84, adsorption zone 85, feed gas engaging zone 86, rich gas product disengaging zone 87, preferential desorption zone 88, adsorbent heating zone 89, stripping gas engaging zone 90, adsorbent flow control zone 91, bottom zone 92 and induction zone 93. The adsorbent passes through the column by gravity as a substantially compact moving bed and accumulates in bottom zone 92 forming accumulation 94.

The gaseous mixture to be separated is introduced into the column at a midpoint through line 118 at a rate controlled by valve 119. This feed gas passes from feed gas engaging zone 86 upwardly through adsorption zone 85 countercurrent to the downwardly flowing adsorbent. During this countercurrent contact the more readily adsorbable constituents of the gaseous mixture are adsorbed on the adsorbent forming a rich adsorbent and leaving a substantially unadsorbed lean gas containing the less readily adsorbable constituents. Most of this lean gas is removed from lean gas disengaging zone 84 via line 120 controlled by valve 121. The remaining part of the lean gas product passes upwardly through the tubes of cooling zone 83 countercurrent to the down-flowing adsorbent and serves to desorb traces of stripping gas from the adsorbent and to saturate it with lean gas product constituents. This is called the "purge gas" and is removed from separator 81 via line 111 controlled by valve 112 with the lift gas employed in conveying the adsorbent, or it may be removed separately from the column at a point not shown but which is immediately above the cooling zone.

The rich adsorbent formed in adsorption zone 85 passes through engaging zone 86 into rectification zone 86a wherein the adsorbent is countercurrently contacted with a reflux gas containing more readily adsorbable constituents. There is a sharp adsorbent temperature rise of about 40° F. or 50° F. connected with this contact of reflux gas. Traces of adsorbed less readily adsorbable constituents are preferentially desorbed from the rich adsorbent and the reflux gas constituents are adsorbed forming a rectified adsorbent.

The rectified adsorbent thus formed passes through rich gas product disengaging zone 87 into preferential desorption zone 88 wherein a stripping gas introduced via line 116 into engaging zone 190 and passing upwardly through the tubes of heating zone 89 contacts the rectified adsorbent in zone 88. The major proportion of the adsorbed constituents on the rectified adsorbent are hereby desorbed forming a rich gas. Part of this gas is employed as rich gas reflux while the remaining portion is removed from zone 87 by means of line 122 at a rate controlled by valve 123 which in turn is actuated by temperature recorder controller 124 operating in conjunction with thermocouple point 125 which detects the sharp temperature break existing in rectification zone 86 described above. The stripping gas usually employed in stripping the adsorbent is steam and a mixture of rich gas and steam is thus removed from zone 87. The rich gas passes into rich gas product cooler 126 wherein condensation of the steam is effected. The cooled mixture passes into separator 127 wherefrom the steam condensate is removed via line 128 controlled by valve 129 and liquid level controller 130. The steam-free rich gas product is removed from separator 127 via line 131 controlled by valve 132 and forms a rich gas product which is substantially completely free of less readily adsorbable constituents appearing in the lean gas product.

The adsorbent is continuously withdrawn from accumulation 94 and returned to separator zone 81 by the conveyance method of the present invention. A different modification of the conveyance method is shown in Figure 9 from those shown and described above. Herein the adsorbent is continuously withdrawn from accumulation 94 and passes via transfer line 95 into auxiliary surge vessel 96 which functions as an auxiliary accumulation zone outside of the column proper. Accumulation 94 in bottom zone 92 is maintained with an adsorbent level 97, the position of which is controlled by directly actuating level controller 98 which in turn regulates the position of thrust plate 99 and exercises control of the quantity of adsorbent discharged into surge vessel 96. In a selective adsorption process operating at a pressure of 100 pounds per square inch for example, a constant pressure drop of about 10 pounds per square inch is maintained across transfer line 95 by flowing a controlled quantity of gas through line 95 and thus adsorbent continuously is introduced into auxiliary surge vessel 96. Induction zone 93 positioned at the lower extremity of the adsorption column need not be provided with any baffles which have been described above in connection with other modifications of the solids check valve since the pressure drop across lift line 95 is of constant magnitude and direction and no reverse flow of gas occurs.

Surge vessel 96 is provided at its lower extremity with induction zone 102 into which lower lift conduit 103 extends. Induction zone 102 is provided with the baffles characteristic of the solids check valve of this invention. Lower lift conduit 103 is in actuality at least two lift lines which connect surge vessel 96 with at least two intermediate pressuring vessels 104. Each of intermediate pressuring vessels 104 is connected to separator 81 by means of separate upper lift lines 105. Thus, when the first of intermediate pressuring vessels 104 is in a depressed condition and receiving adsorbent from surge vessel 96 via one of lower lift lines 103 the other is in a pressured condition and delivering adsorbent into separator 81 via one of upper lift lines 60 and thus a continuous flow of adsorbent passes from separator 81 downwardly through the column as previously described. In the selective adsorption operation assumed in this instance which operates at about 100 pounds per square inch, the pressure drops existing across lift lines 103 and 105 are in the neighborhood of 40 to 50 pounds per square inch under normal operating conditions. Therefore, intermediate pressuring vessels 104 operate at a fluctuating pressure of from about 50 to about 140 pounds per square inch. When depressured to 50 pounds per square inch adsorbent passes from induction zone 102 through line 103 against thrust plate 106 filling the depressured vessel to level 107. This vessel is then pressured from 50 pounds per square inch to about 140 pounds per square inch and the adsorbent thus introduced is discharged through induction zone 108 through one of lift lines 105 into separation zone 81, while the other intermediate pressuring vessel 104 is depressured and filling with adsorbent from surge vessel 96. The fluctuating pressures in vessels 104 is attained by introducing or removing a lift gas through line 109 controlled by valve 110 and the lift gas thus introduced is removed from separator 81 via line 111 controlled by valve 112. The adsorbent discharging into separator 81 is thrust against thrust plate 113 and flows downwardly through hopper zone 82 into the column. Generally, the intermediate pressuring vessels fluctuate in pressure between limits defined by $P \pm \Delta p$ where $P$ is the operating pressure and $\Delta p$ is the pressure differential across the lift lines.

Referring to surge vessel 96, the lift gas employed for conveyance of adsorbent thereinto from the bottom of the column may be introduced into the bottom of the column via line 114 controlled by valve 115, or it may comprise a fraction of the stripping gas introduced into stripping gas engaging zone 86 by means of line 116 controlled by valve 117. The lowered pressure maintained in surge vessel 96 relative to that in the adsorption column may be controlled by removing a part of this gas via line 100 or it may be controlled by removing this gas via lift line 103 together with the adsorbent. In other words, the lift gas introduced into the bottom of the column may be employed in quantities sufficient to lift the entire circulating stream of adsorbent by allowing it to pass, for example, from 100 pounds in zone 92 to 90 pounds in vessel 96 and subsequently to points in vessels 104 in conveying the adsorbent to that point. In this type of operation, if desired, additional lift gas may be supplied to vessel 96 via line 100 controlled by valve 101 to a pressure of about 90 pounds per square inch.

A single vessel 104 and upper lift line 105 have been shown on the drawing for sake of clarity and it is to be understood that at least two intermediate pressuring vessels 104, upper lift lines 105, and lower lift lines 103 are to be employed for each auxiliary surge vessel 96 into the conveyance system. It is to be further understood that although only a single auxiliary surge vessel 96 is shown, two or more of these vessels may be placed around the base of the column if desired. Such a modification is particularly desirable in large columns where the quantity of material to be recirculated is great. The use of auxiliary surge vessels 96 also functions to lower the height of the column and has the effect of reducing markedly the initial fabrication expense of the column.

It is also to be understood that the present modification of conveyance operation may be employed with other than the selective adsorption process and is not to be limited to the particular modification above.

The lift gas employed in conveying the adsorbent from the bottom to the top of the column is preferably a portion of the lean gas product or of the purge gas so that this lift gas in discharging into separator 81 will not then contaminate the adsorbent with more readily adsorbable constituents and consequently will not contaminate the lean gas product. A portion of this purge gas or the lean gas product may be compressed slightly and introduced into bottom zone 92 by means of line 114. A further portion of the lean gas or purge gas may be compressed from about 100 pounds to about 140 pounds per square inch for utilization as a lift medium in the upper lift lines 105 in conveying adsorbent from intermediate pressure vessels 104 to separator 81. Various well known methods for economizing on pressure may be employed in connection with the series of pressuring vessels 104 which include using gas from one vessel at a high pressure to partially pressure up the other vessels, and the like. Further, intermediate pressuring vessels 104 may be provided with level controls 133 which serve to indicate the levels of adsorbent therein and to act as a controller in actuating the flows of lift gas into and out of these vessels to achieve a continuous adsorbent flow. Thus, when adsorbent level 107 reaches a high value in one vessel, level controller 133 will cause a pressuring of that vessel and a depressuring of the other vessel or vessels causing them to fill while the first vessel empties. This level control also indicates low adsorbent level 107a and suitably actuates the lift gas flow to cause a depressuring of the vessel and a consequent rise in the adsorbent level.

If desired, a lift gas comprising a portion of the rich gas product may be employed in which gas it is introduced directly into bottom zone 97 via line 114 and employed substantially in the same manner as the lean gas or purge gas described above. The major difference encountered in employing a rich lift gas is that the adsorbent, although at a high temperature will contain some adsorbed rich gas constituents as it discharged into separator 81 under these conditions. This adsorbent in passing through lean gas disengaging zone 84 would give up part of these constituents to the lean gas, thus contaminating it. Therefore a higher percentage of the lean gas production is preferably passed through the cooler as purge gas to strip off these rich gas constituents to avoid lean gas product contaminations. The purge gas thus formed contains more readily adsorbable constituents and may be combined with the feed gas for reseparation, if desired.

Stripping steam may be employed as a lift gas medium by allowing a portion of the stripping steam to pass downwardly concurrent with the adsorbent from stripping gas engaging zone 90 and then through transfer line 95 into auxiliary surge vessel 96. Care must be taken under these conditions to maintain the adsorbent in the conveyance system at a temperature above the dew point of the lift gas to avoid condensation on the adsorbent which results in difficult conveyance. The adsorbent usually is heated to a temperature of about 500° F. in heating zone 89 and in transfer line 95, surge vessel 96, lower lift lines 103, intermediate pressuring vessels 104, and upper lift lines 105 are insulated against heat loss, stripping steam may be used as an efficient lifting medium. Other stripping gases having high viscosities and high densities, and which are not contained in the feed gas or normally employed in the process may be employed, if desired, since the process inherently lends itself to adequate sealing of the process gas streams from any such "foreign" lift gases.

In the selective adsorption process described above granular adsorbents having a mesh size of from 10 to about 40 or smaller may be employed and adsorbents having mesh sizes as small as about 2 or as high as about 100 can be utilized. Preferably, however, the mesh size of the adsorbent ranges from about 12 to 20 or 30. Further, the preferred granular adsorbent comprises activated vegetable charcoal such as that prepared from coconut hulls or from fruit pits, although other well known granular adsorbents may be employed in the process for the separation of gaseous mixtures.

The induction zones and lift conduits have been described as being of cylindrical cross section, this is to be preferred where the apparatus is operated under pressure. It is not intended, however, to limit the invention in this manner since elliptical, triangular, square, or other shaped cross sections may be employed. The same angular relationships between the baffles must be maintained, however.

The lift and transfer conduits may be fabricated so that they have cross sectional areas which increase in the direction of flow. This is desirable to maintain a constant lift gas velocity in spite of the lift gas depressuring effect. Constructions of lift lines having such characteristics are shown and claimed in copending application Serial No. 67,237 and are such that smooth lift line operation results.

The present invention is further not to be limited to the use of a single lift or transfer conduit since multiple tubes may be employed in parallel for transferring increased quantities of solids where necessary.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A method for conveyance of granular solids which comprises establishing an intermediate pressuring zone communicating through a first conveyance zone with an induction zone and through a second conveyance zone with a separator zone, introducing a conveyance fluid and granular solids to be conveyed into said induction zone, alternately lowering the pressure in said intermediate pressuring zone by removal of conveyance fluid therefrom to a pressure below that of said induction zone to cause said conveyance fluid to flow from said induction zone into said intermediate pressuring zone through said first conveyance zone at a rate sufficient to convey said solids concurrently therethrough and then raising the pressure in said intermediate pressuring zone by introducing conveyance fluid thereinto to a pressure above that in said separator zone to cause said conveyance fluid to flow from said intermediate pressuring zone into said separator zone through said second conveyance zone at a rate sufficient to convey said solids concurrently therethrough, applying a force to the solids discharging from said first and second conveyance zones to maintain said solids therein during conveyance in substantially compact form at a bulk density substantially equal to the static bulk density of said solids when at rest, and removing conveyed solids and said conveyance fluid from said separator zone.

2. A method according to claim 1 in combination with the step of maintaining substantially constant pressures in said induction and separator zones.

3. A method for the conveyance of granular solids which comprises establishing an induction zone communicating through a first conveyance zone with an intermediate pressuring zone, establishing a separator zone communicating through a second conveyance zone with said intermediate pressuring zone, introducing solids to be conveyed and a conveyance fluid into said induction zone, conveying said solids as a mass having a bulk density substantially equal to the static bulk density of said solids from said induction zone to said separator zone in the presence of a concurrent flow of said conveyance fluid by first depressuring said intermediate pressuring zone by removing conveyance fluid therefrom to a pressure below that of said induction zone to cause said conveyance fluid to flow through said first conveyance zone at a rate sufficient to convey said solids therethrough and second pressuring said intermediate pressuring vessel by the introduction of conveyance fluid thereinto to a pressure above that of said separator zone to cause said conveyance fluid to flow through said second conveyance zone at a rate sufficient to convey said solids therethrough, applying a force to the solids discharging from said first and second conveyance zones to maintain said solids therein substantially at said static bulk density, alternately depressuring and pressuring said intermediate pressuring vessel to continue the conveyance of said solids, and removing conveyed solids and conveyance fluid from said separator zone.

4. The method according to claim 3 in combination with the steps of preventing solids flow from said separator zone into said intermediate pressuring zone when said latter zone is depressured and preventing solids flow from said intermediate pressuring zone into said induction zone when said former zone is pressured.

5. A method for the conveyance of granular solids which comprises establishing a first induction zone communicating with a source of solids to be conveyed, a separator zone communicating with a destination for conveyed solids and at least one intermediate pressuring zone each provided with a second induction zone and each communicating through a first conveyance zone with said first induction zone and through a second conveyance zone with said separator zone, flowing solids from said source into said induction zone, maintaining said first induction zone at a pressure $P_1$, maintaining said separator zone at a pressure $P_2$, depressuring said intermediate pressuring zone to a pressure of $P_1-\Delta p_1$ to cause said conveyance fluid to flow through said first conveyance zone at a rate sufficient to establish a pressure drop of $\Delta p_1$ therein and to convey said solids from said induction zone into said intermediate pressuring zone, then pressuring said intermediate pressuring zone to a pressure of $P_2+\Delta p_2$ by introducing conveyance fluid thereinto to cause said conveyance fluid to flow through said second conveyance zone at a rate sufficient to establish a pressure drop of $\Delta p_2$ therein and to convey said solids from said intermediate pressuring zone into said separator zone, alternately depressuring and pressuring said intermediate pressuring zone between pressure limits of $P_1-\Delta p_1$ and $P_2+\Delta p_2$ to continue the flow of solids from said induction zone into said separator zone, applying a force to the solids discharging from each of said first and second conveyance zones to maintain said solids therein during conveyance at a bulk density substantially equal to the static bulk density of said solids, removing conveyance fluid from said separator zone, and flowing conveyed solids therefrom to said destination.

6. A method according to claim 5 wherein said source and said destination of said solids are maintained at substantially the same pressure and $P_1$ is substantially equal to $P_2$.

7. A method according to claim 5 in combination with the steps of preventing solids flow from said separator zone into said intermediate pressuring zone and from said latter zone into said first induction zone by maintaining a solids check valve in said first and second induction zones.

8. A method according to claim 5 wherein said conveyance fluid introduced into said first induction zone at a pressure $P_1$ is removed from said intermediate pressuring zone at a pressure of $P_1-\Delta p_1$.

9. A method for the circulation of granular solids through a treating zone which comprises establishing a treating zone communicating in solids-receiving relation with a separator zone and in solids-delivery relation with an induction zone, establishing an intermediate pressuring zone communicating through a first conveyance zone with said induction zone and through a second conveyance zone with said separator zone, flowing solids from said separator zone into and through said treating zone, flowing said solids from said treating zone into said induction zone, introducing a conveyance fluid into said induction zone, alternately depressuring said intermediate pressuring zone by removal of said conveyance fluid therefrom to a pressure below that in said induction zone to cause said conveyance fluid to flow through said first conveyance zone at a rate sufficient to convey said solids therethrough into said intermediate pressuring zone and pressuring said intermediate pressuring vessel by introduction of conveyance fluid thereinto to a pressure above that in said separator zone to cause said conveyance fluid to flow through said second conveyance zone at a rate sufficient to convey said solids therethrough into said separator zone, maintaining said solids during conveyance through said conveyance zones at a bulk density substantially equal to the static bulk density of said solids when at rest by applying a force to said solids discharging from each of said conveyance zones, and continuing the alternate pressuring and depressuring of said intermediate pressuring zones to maintain recirculation of said solids.

10. A method according to claim 9 wherein said treating zone includes a solids-fluid contacting zone and a solids regeneration zone.

11. A process for the continuous recirculation of granular solids through a vessel containing at least one treating zone which comprises establishing an induction zone below and a separator zone above and each communicating with said treating zone, establishing an auxiliary surge zone communicating through a transfer zone with said induction zone, establishing at least a first and a second intermediate pressuring zone each communicating through a first and second lower conveyance zone respectively with said auxiliary surge zone and through a first and a second upper conveyance zone respectively with said separator zone, passing solids from said treating zone into said induction zone, introducing a conveyance fluid into said induction zone, maintaining the pressure in said auxiliary surge zone below that in said induction zone to cause a flow of said conveyance fluid through said transfer zone at a rate sufficient to convey said solids therethrough; first, pressuring said first intermediate pressuring zone by introduction of conveyance fluid thereinto to a pressure above that of said separator zone to cause a flow of conveyance fluid through said first upper conveyance zone at a rate sufficient to convey solids therethrough and depressuring said second intermediate pressuring zone by removal of conveyance fluid therefrom to a pressure below that of said auxiliary surge zone to cause a flow of conveyance fluid through said second lower conveyance zone at a rate sufficient to convey solids therethrough; second, depressuring said first intermediate pressuring zone by removal of conveyance fluid therefrom to a pressure below that of said auxiliary surge zone to cause a flow of conveyance fluid through said first lower conveyance zone at a rate sufficient to convey solids therethrough and pressuring said second intermediate pressuring zone by introduction of conveyance fluid thereinto to a pressure above that of said separator zone to cause a flow of conveyance fluid through said second upper conveyance zone at a rate sufficient to convey solids therethrough, alternately depressuring and pressuring said intermediate pressuring zones in sequence to obtain a continuous withdrawal of solids from said auxiliary surge zone and their introduction into said separator zone, removing conveyance fluid from said separator zone, flowing conveyed solids therefrom into said treating zone for passage therethrough, and maintaining the solids during conveyance at a bulk density substantially equal to the static bulk density of said solids by the steps of applying solids compacting forces to the solids discharging from each of said transfer zone and said upper and lower conveyance zones.

12. A method according to claim 9 wherein two intermediate pressuring vessels each communicating through a first and a second conveyance zone respectively with said induction zone and said separator zone are provided, in combination with the steps of pressuring and depressuring said intermediate pressuring vessels in sequence to obtain a continuous transferal of said solids.

13. A process according to claim 9 in combination with the steps of flowing a portion of said conveyance fluid from said induction zone into the bottom of said contacting zone and flowing a portion of said conveyance fluid from said separator zone into the top of said contacting zone to seal each of said induction and separator zones from the contacting zone.

14. A solids flow check valve which comprises an induction chamber, a conveyance conduit having an inlet opening disposed in the lower portion of said chamber and a series of at least two vertically spaced baffles thereabove so arranged that each baffle covers only a portion of the horizontal area of the chamber, the series of baffles covers the entire horizontal area, the open edge of each baffle overlaps the nearest open edge of the adjacent baffles and the base angle which a line drawn on a vertical plane through the vertical axis of said induction chamber and extending from an open edge of one baffle to the nearest open edge of each adjacent baffle makes with a horizontal plane is greater than the static angle and less than the dynamic angle of the solid particles so that a tortuous passageway is provided between the baffles through which solids may flow downwardly and may not flow upwardly therethrough.

15. A solids flow check valve apparatus which comprises an induction chamber, an inlet for introducing granular solids thereinto, an outlet conduit disposed coaxially within said induction chamber and having its inlet opening spaced apart from the bottom of said induction chamber, at least one inner radial baffle integrally attached only to the external surface of said outlet conduit within said induction chamber and having an open edge spaced apart from the internal wall thereof, at least one outer radial baffle integrally attached only to the internal wall of and within said induction chamber and having an open edge spaced apart from the external surface of said outlet conduit thereby providing a tortuous path for solids flow around said open edges and between said wall and said outlet conduit, said baffles being spaced apart so that a line drawn between corresponding points on said open edges thereof describes an angle with respect to the plane of said open edges which is at most the dynamic angle beta characteristic of said solids, said apparatus being adapted to permit solids flow from said induction chamber into and through said outlet conduit and prevent solids flow in the reverse direction.

16. An apparatus which comprises an induction chamber, an outlet conduit for solids therefrom extending into and through said chamber and terminating therein in an inlet opening at a point adjacent the bottom of said chamber, means for introducing granular solids into said induction chamber to form an accumulation thereof having a level above said inlet opening, at least one inner radial baffle attached to the external surface of said conduit above said inlet opening and having an open edge spaced apart from the inner surface of said chamber, at least one outer radial baffle attached to the inner surface of said chamber above said inlet opening and having an open edge spaced apart from the external surface of said outlet conduit, the open edge of said inner baffle being a greater distance from the axis of said outlet conduit than the open edge of said outer baffle thereby providing a tortuous path for solids flow downwardly between said inner surface of said induction chamber and the external surface of said outlet conduit therein, said baffles being so spaced apart from each other that a line drawn on a vertical plane through corresponding points on said open edges of adjacent baffles subtends an angle with respect to the planes of said open edges which is less than the characteristic dynamic flow angle beta and greater than the angle of repose characteristic of said solids whereby solids are permitted to flow from said induction chamber into said outlet conduit and are prevented from flowing in the reverse direction.

17. A process for the conversion of hydrocarbons by contact with a substantially compact moving bed of hydrocarbon conversion catalyst which comprises passing a compact moving bed of catalyst by gravity from a separator zone through a contacting zone containing a reaction zone and a regeneration zone separated by a sealing zone, contacting the catalyst in said reaction zone with said hydrocarbons to form a hydrocarbon conversion product and spent catalyst particles, contacting spent catalyst particles in said regeneration zone with a regeneration gas forming regenerated catalyst particles, flowing catalyst particles from said contacting zone into an induction zone communicating via at least one lower conveyance zone respectively with at least one intermediate pressuring zone, each of said intermediate pressuring zones in turn communicating through an upper conveyance zone with a separator zone, periodically pressuring and depressuring said intermediate pressuring zone between limits above and below the mean operating pressure of said contacting zone by the introduction and removal of lift gas respectively thereby passing granular solids upwardly through said lower conveyance zone as a substantially compact moving mass from said induction zone concurrently with lift gas flowing therethrough when said intermediate pressuring zone is in a depressured condition and passing granular solids upwardly in substantially compact form through said upper conveyance zone concurrently with lift gas flowing therethrough into said separator zone when said intermediate pressuring zone is in a pressured condition, and applying a thrust force against the flow of solids issuing from each of said upper and lower conveyance zones to maintain the solids therein in substantially compact form at substantially the same bulk density as the moving bed of solids passing downwardly through said contacting zone.

18. A method for the conveyance of granular solids which comprises establishing an auxiliary surge zone communicating with an intermediate pressuring zone and a third zone communicating with said intermediate pressuring zone, continuously depressuring a concurrent flow of compact granular solids and a conveyance fluid into said auxiliary surge zone, alternately pressuring and depressuring said intermediate pressuring zone above and below the pressure of said third zone and said auxiliary surge zone respectively thereby alternately depressuring a concurrent flow of compact granular solids and a conveyance fluid from said intermediate pressuring zone to said third zone and from said auxiliary surge zone to said intermediate pressuring zone respectively, maintaining the granular solids during conveyance at a bulk density substantially equal to the static bulk density by applying a force against the discharge of said solids into said intermediate pressuring zones, said auxiliary surge zone and said third zone, and continuously withdrawing from said third zone a stream of compact granular solids and conveyance fluid.

19. A method for the conveyance of granular solids which comprises establishing an auxiliary surge zone communicating with an intermediate pressuring zone and a third zone communicating with said intermediate pressuring zone, continuously depressuring a concurrent flow of compact granular solids and a conveyance fluid into said auxiliary surge zone, first depressuring said intermediate pressuring zone to a pressure below the pressure of said auxiliary surge zone thereby depressuring a concurrent flow of compact granular solids and a conveyance fluid from said auxiliary surge zone to said intermediate pressuring zone, subsequently pressuring said intermediate pressuring zone to a pressure above the pressure of said third zone thereby depressuring a concurrent flow of compact granular solids and a conveyance fluid from said intermediate pressuring zone to said third zone, repeating the successive pressuring and depressuring of said intermediate pressuring zone, removing a continuous stream of compact and unsuspended granular solids and a conveyance fluid from said third zone, and maintaining the granular solids during conveyance at a bulk density substantially equal to the static bulk density by applying a force against the discharge of said solids into said intermediate pressuring zones, said auxiliary surge zone and said third zone.

20. A method according to claim 19 wherein the operating pressures of said auxiliary surge zone and said third zone are maintained substantially constant during operation.

21. A process for catalytic cracking of hydrocarbons which comprises passing a substantially compact moving bed of granular catalyst downwardly by gravity through a hydrocarbon cracking zone and a catalyst regeneration zone, contacting regenerated catalyst with a hydrocarbon in said cracking zone to form a cracked hydrocarbon product and spent catalyst, contacting said spent catalyst in said regeneration zone with oxygen-containing regeneration gases to form flue gas and said regenerated catalyst, passing said regenerated catalyst into an induction zone communicating through at least one lower conveyance zone with at least one intermediate pressuring zone which in turn communicates through at least one upper conveyance zone with a separator zone, introducing a conveyance fluid into said induction zone, alternately pressuring and depressuring said intermediate pressuring zone by introduction and removal of conveyance fluid between pressures sufficiently above and sufficiently below the pressures in said separator and induction zones respectively to cause conveyance fluid flow alternately through said upper and lower conveyance zones respectively at rates sufficient to convey said catalyst therethrough from said induction zone to said separator zone, applying a solids compacting force against the catalyst discharging from each of said conveyance zones to maintain the catalyst solids during conveyance substantially at their static bulk density, and flowing the catalyst thus conveyed from said separator zone into said cracking zone.

22. An apparatus for the conveyance of granular solids in compact form at substantially their static bulk density which comprises a first induction vessel, an intermediate pressuring vessel, a second induction vessel communicating with the bottom of said intermediate pressuring vessel, a separator vessel, an inlet conduit for solids to be conveyed opening into the upper part of said first induction vessel, an inlet for a conveyance fluid opening into the upper part of said first induction vessel, a lower conveyance conduit having an inlet opening within said first induction vessel at a point near the bottom thereof and below the level of solids therein and an outlet opening within said intermediate pressuring vessel near the top thereof, an upper conveyance conduit having an inlet opening within said second induction vessel at a point near the bottom thereof and below the level of solids therein and an outlet opening within said separator vessel, means for removing conveyed solids and the conveyance fluid from said separator vessel, means for alternately pressuring and depressuring said intermediate pressuring vessel by introduction and removal of conveyance fluid respectively whereby conveyance fluid flows through said upper and lower conveyance conduits at rates sufficient to convey said solids therethrough and alternately empty and fill said intermediate pressuring vessel with solids, means adjacent said outlet openings of each of said upper and lower conveyance conduits for applying a force against solids discharging therefrom to maintain said solids at a bulk density substantially equal to the static bulk density of said solids when at rest, and means in said induction chambers to prevent a reverse flow of solids through said conveyance conduits, said last-named means comprising at least one inner baffle integrally attached to the outer surface of the conveyance conduit therein and having an open edge spaced apart from the inner wall of said induction vessel and at least one outer radial baffle integrally attached to the inner wall of said induction vessel and having an open edge spaced apart from the outer surface of said conveyance conduit, said baffles being so spaced apart with their open edges overlapping so that a line drawn on a vertical plane through corresponding points on said open edges of adjacent baffles subtends an angle with respect to the planes of said open edges which is less than the characteristic dynamic flow angle beta and greater than the angle of repose characteristic of said solids.

23. A process for the catalytic cracking of hydrocarbons which comprises passing a substantially compact moving bed of granular catalyst downwardly by gravity through a catalyst regeneration zone and a hydrocarbon cracking zone, contacting regenerated catalyst with a hydrocarbon in said cracking zone to form a cracked hydrocarbon product and spent catalyst, contacting said spent catalyst in said regeneration zone with oxygen-containing regeneration gases to form flue gas and regenerated catalyst, passing said spent catalyst into an induction zone communicating through at least one lower conveyance zone with at least one intermediate pressuring zone which in turn communicates through at least one upper conveyance zone with a separator zone, introducing a conveyance fluid into said induction zone, alternately pressuring and depressuring said intermediate pressuring zone by introduction and removal of conveyance fluid between pressures sufficiently above and sufficiently below the pressures in said separator and induction zone respectively to cause conveyance fluid flow alternately through said upper and lower conveyance zones respectively at rates sufficient to convey said catalyst therethrough from said induction zone to said separator zone, applying a solids compacting force against the catalyst discharging from each of said conveyance zones to maintain the catalyst solids during conveyance substantially at their static bulk density, and flowing the catalyst thus conveyed from said separator zone into said regeneration zone.

24. A process for the catalytic cracking of hydrocarbons which comprises establishing a cracking zone and a catalyst regeneration zone, passing regenerated catalyst downwardly by gravity as a substantially compact moving bed through said cracking zone in contact with a hydrocarbon forming spent catalyst and cracked hydrocarbons, subsequently passing said spent catalyst downwardly by gravity as a substantially compact moving bed through said regeneration zone in contact with oxygen-containing regeneration gases to form flue gases and regenerated catalyst, conveying said regenerated catalyst removed from said regeneration zone as a substantially compact mass through a first conveyance zone having a first intermediate pressuring zone to said cracking zone and conveying said spent catalyst removed from said cracking zone as a substantially compact mass through a second conveyance zone having a second intermediate pressuring zone to said regeneration zone by the steps of alternately raising and lowering the pressures of said intermediate pressuring zones between limts above and below the pressure existing at the outlet and inlet respectively of said conveyance zones to cause a conveyance fluid flow therethrough at rates sufficient to convey said catalyst, and applying a force to the catalyst discharge from each part of said conveyance zones to maintain said compact mass of catalyst flowing therethrough at a bulk density substantially equal to the static bulk density of said catalyst to maintain a continuous recirculatory catalyst flow.

References Cited in the file of this patent

UNITED STATES PATENTS

| Number | Name | Date |
|---|---|---|
| 1,577,534 | Miller | Mar. 23, 1926 |
| 1,702,311 | Pantenburg | Feb. 19, 1929 |
| 1,825,707 | Wagner, Jr. | Oct. 6, 1931 |
| 2,311,564 | Munday | Feb. 16, 1943 |
| 2,439,811 | Jewell | Apr. 20, 1948 |
| 2,463,623 | Huff | Mar. 8, 1949 |
| 2,487,961 | Angell | Nov. 15, 1949 |
| 2,493,911 | Brandt | Jan. 10, 1950 |
| 2,509,983 | Morrow | May 30, 1950 |
| 2,561,409 | Ardern | July 24, 1951 |
| 2,561,771 | Ardern | July 24, 1951 |